Dec. 23, 1952      J. T. COGHILL      2,622,490
APPARATUS FOR TREATING WOOD PULP AND THE LIKE
Filed Sept. 9, 1947      7 Sheets-Sheet 1

INVENTOR.
JAMES T. COGHILL
BY
ATTORNEY

Dec. 23, 1952    J. T. COGHILL    2,622,490
APPARATUS FOR TREATING WOOD PULP AND THE LIKE
Filed Sept. 9, 1947    7 Sheets—Sheet 2
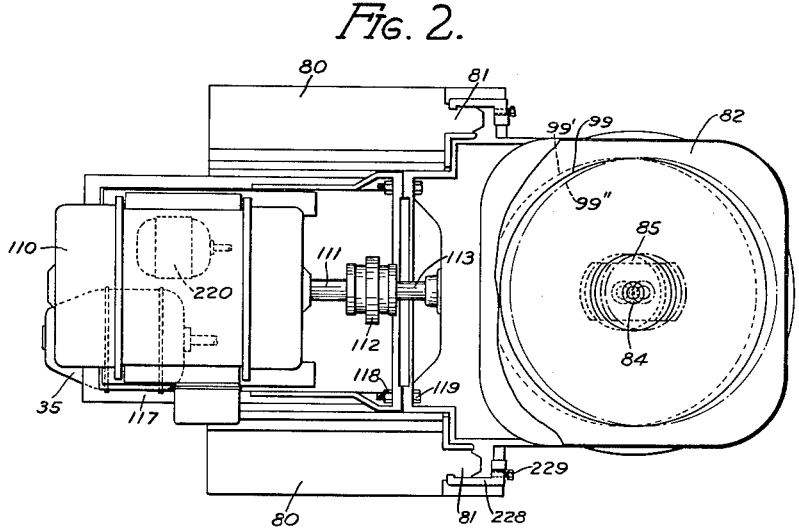
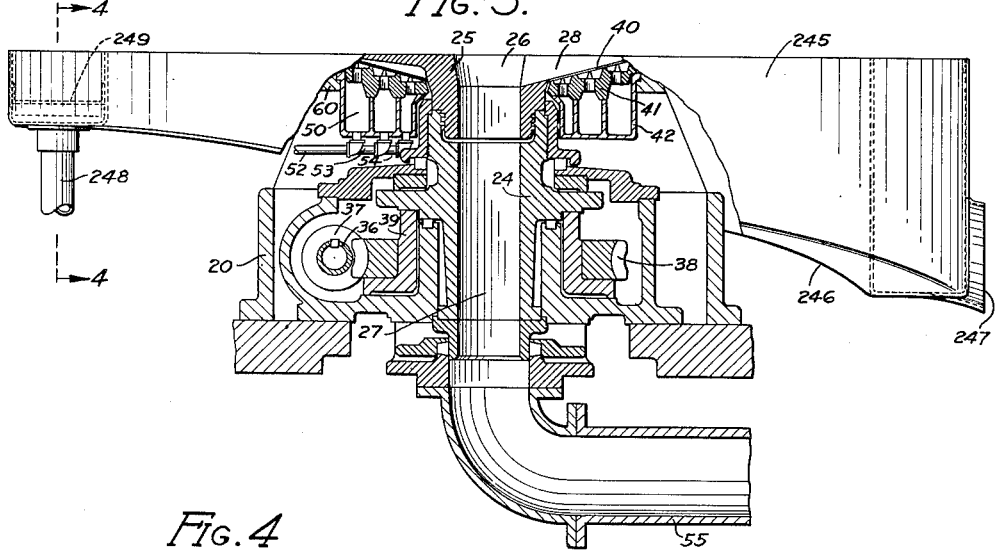
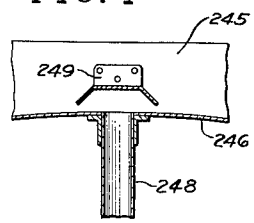
*INVENTOR.*
*JAMES T. COGHILL*
BY
*ATTORNEY*

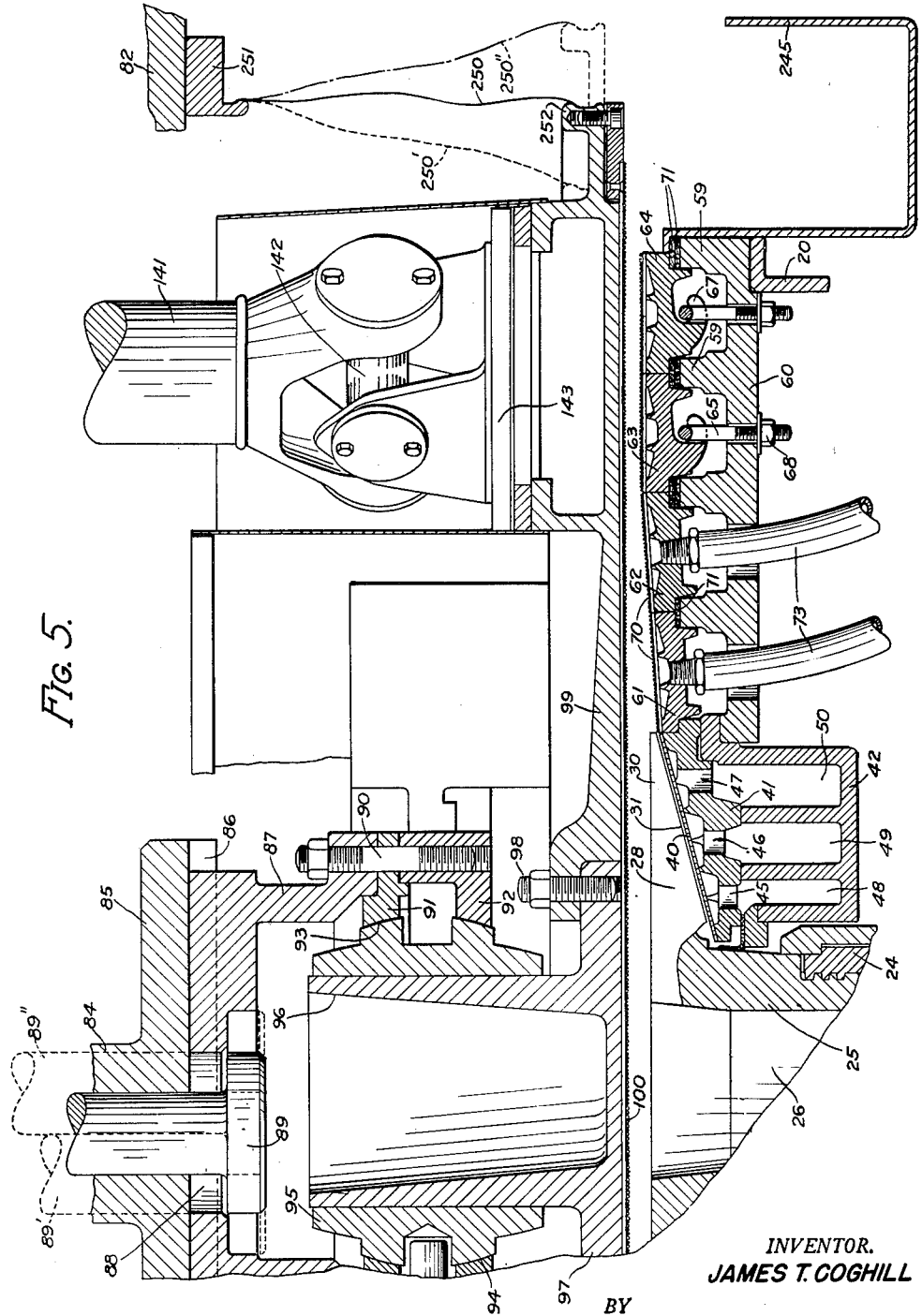

Dec. 23, 1952   J. T. COGHILL   2,622,490
APPARATUS FOR TREATING WOOD PULP AND THE LIKE
Filed Sept. 9, 1947   7 Sheets-Sheet 4
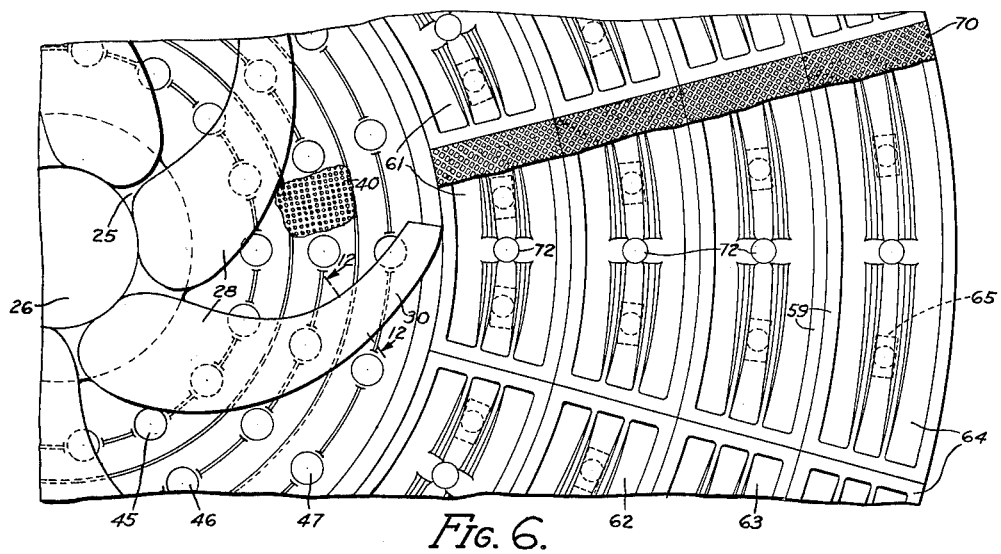
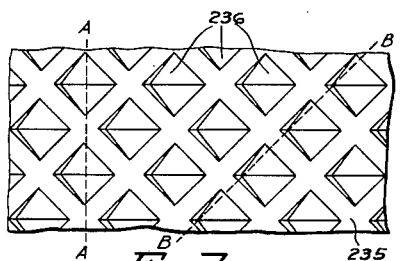
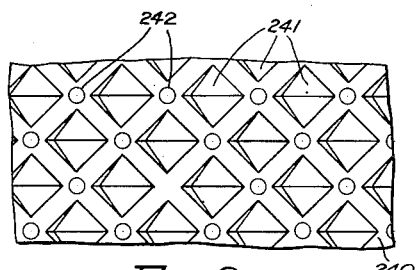
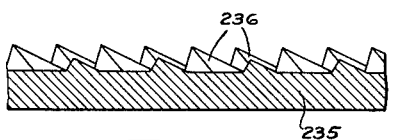
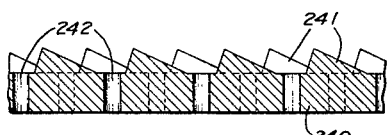
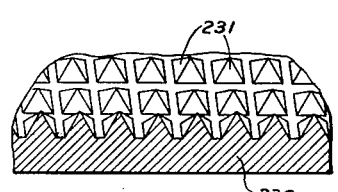
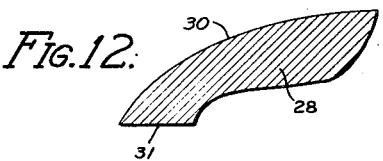
INVENTOR.
JAMES T. COGHILL
BY
ATTORNEY Dec. 23, 1952　　　J. T. COGHILL　　　2,622,490
APPARATUS FOR TREATING WOOD PULP AND THE LIKE
Filed Sept. 9, 1947　　　　　　7 Sheets-Sheet 5

INVENTOR.
JAMES T. COGHILL
BY
Schlesinger
ATTORNEY

Dec. 23, 1952  J. T. COGHILL  2,622,490
APPARATUS FOR TREATING WOOD PULP AND THE LIKE
Filed Sept. 9, 1947  7 Sheets-Sheet 6

INVENTOR.
JAMES T. COGHILL
BY
ATTORNEY

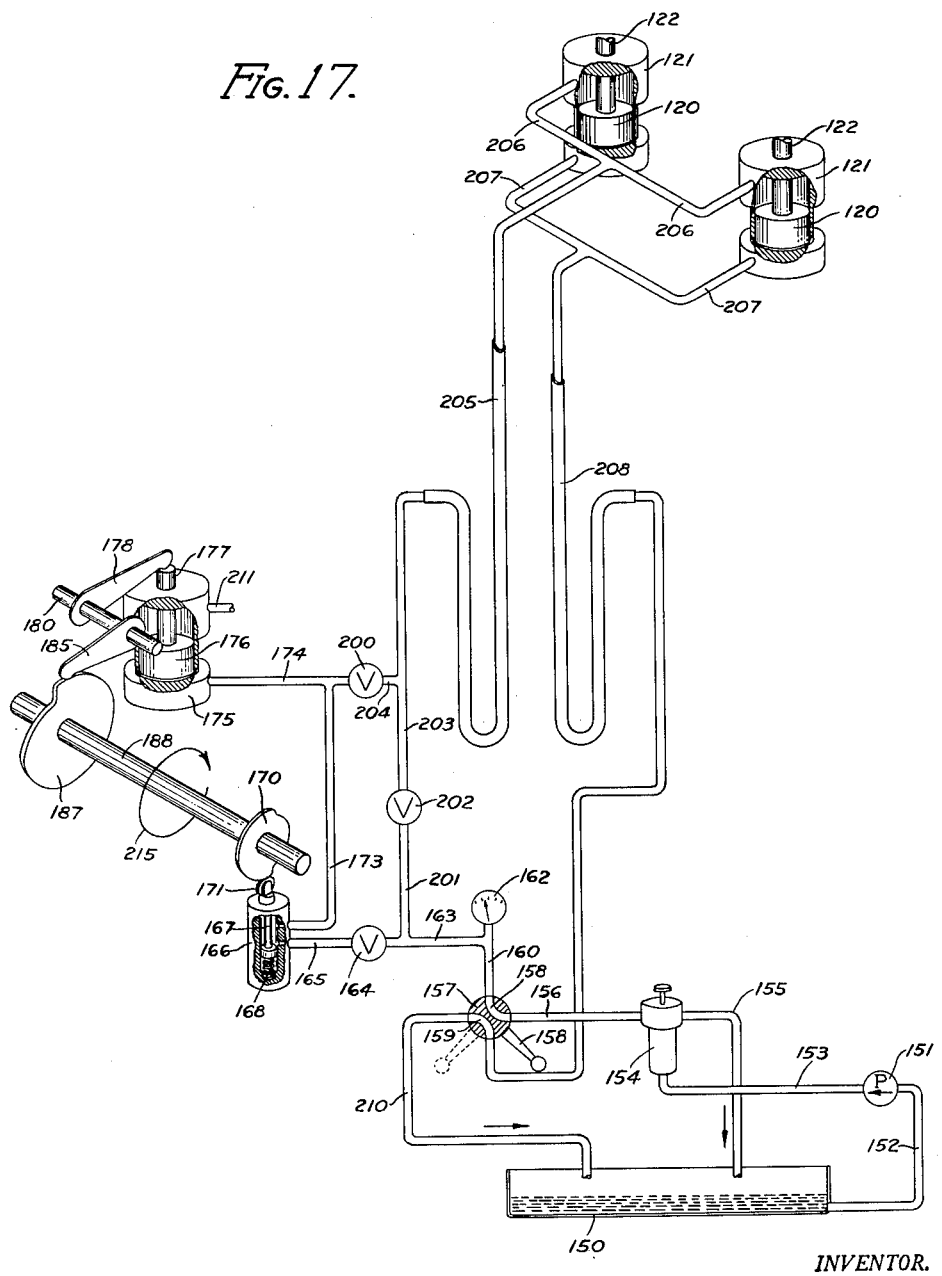

Patented Dec. 23, 1952

2,622,490

UNITED STATES PATENT OFFICE 2,622,490

APPARATUS FOR TREATING WOOD PULP AND THE LIKE

James T. Coghill, Fairport, N. Y., assignor, by mesne assignments, to Curlator Corporation, Rochester, N. Y., a corporation of New York Application September 9, 1947, Serial No. 773,012

12 Claims. (Cl. 92—26)

The present invention relates to machines for processing fibrous material and particularly to machines for processing wood pulp for making paper. In a more specific aspect, the invention relates to an improved machine for mechanically processing wood pulp according to the method disclosed in the Hill and Edwards application Serial No. 565,128, filed November 25, 1944, which has now matured into Patent 2,516,384, granted July 25, 1950.

In the process of Patent No. 2,516,384, the pulp, which is to be treated, is rolled traversingly in different directions in tractive contact with and under compression between two opposed working surfaces. This results in the pulp being formed into nodules in which the fibres of the pulp are intertwined and curled on one another, and in the nodules being formed into rotatable units which will travel rollwise in different directions under compression. Thereby the nodules will be continuously reoriented relative to the direction of applied pressure, and the pulp fibres or fibre bundles will be bent and twisted and subjected to increased contortion as the units of nodules roll traversingly over the working surfaces. This causes separation or liberation of the fibres, which may be bonded together, without mutilating the fibre structure, and while retaining high freeness of the pulp. It also develops new and valuable characteristics in a given pulp, such as high tearing strength, high stretch, both wet and dry, and improved optical qualities.

In addition, the method of Patent No. 2,516,384 provides an effective means for eliminating the small but undesirable shive content of regular commercial grades of pulp, such as sulphite, kraft and soda pulp. Moreover, it supplies a much needed step in the production of so-called high-yield or semi-chemical pulps, all of which require reduction of fibre bundles while retaining high freeness in order to form a clean sheet of paper. The method of Patent No. 2,516,384 unbonds or liberates the individual fibres to an essentially complete degree with a very low expenditure of power and it produces a paper-making pulp of very high freeness.

For production of some types of paper-making pulp, then, this process may be used as a preliminary to the basic step of refining the pulp which may be done by any suitable conventional refining method. For the production of other types of paper-making pulp, this process may be used itself as the basic method of treatment, although for obtaining particular desired qualities of the paper to be produced the pulp may subsequently be subjected for a short period to treatment in a beater or jordan or other conventional refiner. For production of still other types of paper-making pulp, the method of Patent No. 2,516,384 may be used in lieu of conventional refining methods, and these methods eliminated entirely.

One object of the present invention is to provide an efficient machine for carrying out the process of Patent No. 2,516,384 on a commercial scale and in a continuous operation.

Another object of the invention is to provide a machine which will take pulp in the form of an aqueous slurry in a continuous flow, continuously de-water this pulp for treatment, and continuously treat this pulp according to the process of Patent No. 2,516,384.

A further object of the invention is to provide a machine which will both de-water a slurry of pulp and treat that pulp, but which nevertheless will be compact and occupy but a relatively small floor area.

Another object of the invention is to provide a machine of more or less universal character and which may be used not only in the treatment of virgin pulp but also in the treatment of repulped paper, and which may be employed also to effect such operations as bleaching or de-inking during treatment of the pulp.

Another object of the invention is to provide a machine of the character described in which the contour of the lower working surface may be altered and adjusted to control the rate of flow of pulp between the working surfaces.

A further object of the invention is to provide working surfaces of novel form for a machine of the character described and with which the rate of movement of the pulp over these surfaces as the pulp traversingly rolls therebetween may be controlled, thereby to control the extent of treatment of the pulp.

Still another object of the invention is to provide working surfaces for a machine of the character described which are constructed to direct the movement of the pulp therebetween.

Other objects of the invention will be apparent hereinafter from the specification and from the recital of the appended claims.

In the drawings:

Fig. 2 is a plan view on a reduced scale of this machine, parts being broken away;

Fig. 3 is a part elevational, part sectional view, showing the piping through which the aqueous slurry of pulp is supplied to the machine, the mechanism for de-watering this pulp, and the trough to which the pulp is delivered after treatment;

Fig. 4 is a section on the line 4—4 of Fig. 3;

Fig. 5 is a fragmentary sectional view on an enlarged scale showing further details of the structure of the de-watering mechanism and of the opposed working surfaces of the machine, and, in part, the means for gyrating the upper working surface and for moving it cyclically toward and from the lower working surface;

Fig. 6 is a fragmentary plan view, with parts broken away, showing further details of the sweep arms, de-watering plate, and lower working surface;

Figs. 7 and 8 are a fragmentary plan view and a fragmentary sectional view, respectively, on a greatly enlarged scale, showing one way in which the upper working surface of the machine may be constructed;

Figs. 9 and 10 are corresponding views showing one form of lower working surface that may be employed in the machine;

Fig. 11 is a fragmentary view on an enlarged scale, showing a further form of working surface;

Fig. 12 is a transverse section through one of the sweep arms taken on the line 12—12 of Fig. 6;

Figure 15:
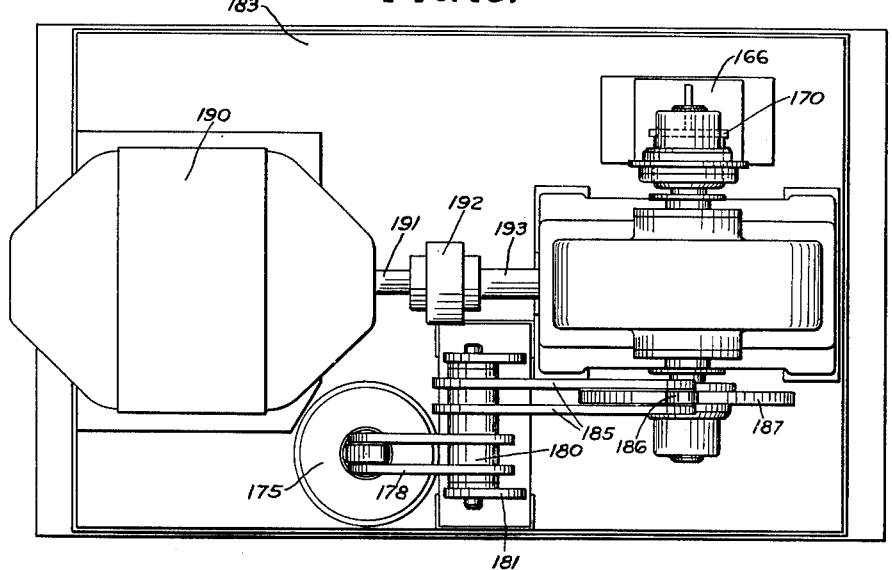
Figure 16:
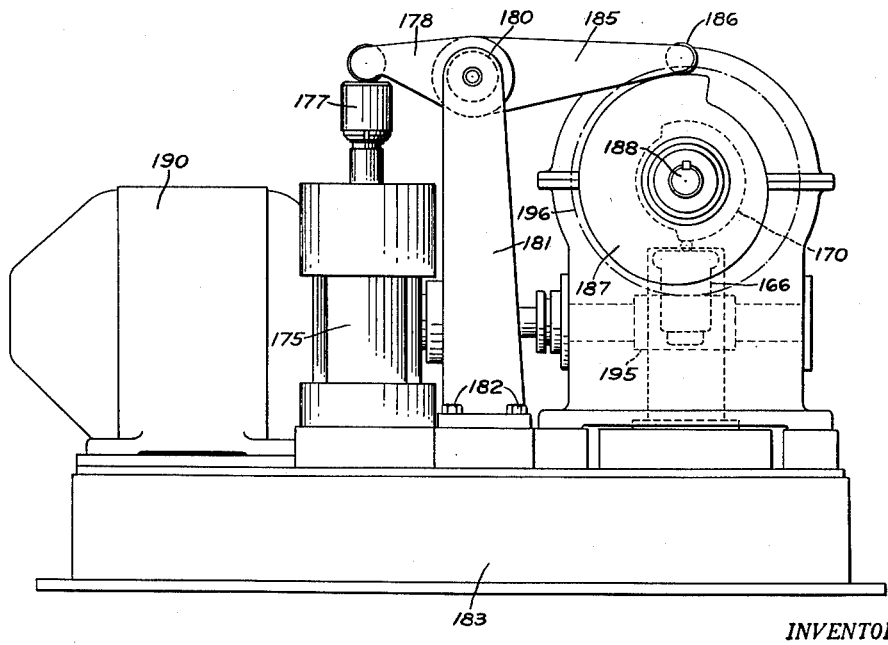

Figs. 15 and 16 are a plan view and a side elevation, respectively, on an enlarged scale, showing the pulsator unit which produces cyclical movement of the upper working surface of the machine; and Fig. 17 is a diagrammatic view showing the manner in which the pulsator unit is connected to the pistons which produce cyclical movement of the upper working surface, and illustrating the manner of operation of this unit.

The machine illustrated in the drawings has a centrally disposed de-watering area, in which the consistency of the stock is raised and in which the stock is nodulated, a lower working surface, which is stationary and which surrounds the de-watering area, and an upper working surface which is given a continuous gyratory or orbital motion during operation of the machine and which extends over both the de-watering area and the lower working surface.

The pulp, which is to be treated, enters the de-watering area of the machine from below through a continuously rotating hollow shaft and fans out over a perforated de-watering plate which surrounds this shaft. A sweep head having arms, which extend outwardly over the de-watering surface, is secured to this shaft, and as the shaft rotates, the arms gather the stock from the surface of the de-watering plate and press it up against the gyrating upper plate while at the same time urging it radially outward. The upper working surface is knurled and the upper surfaces of the sweep arms are roughened. As the stock is carried between the sweep arms and upper plate, then, it is rolled tangentially between them in different directions under compression. The rolling traverse under compression not only squeezes excess water from the pulp, but also causes the thickening stock to be formed into nodules and into aggregates of nodules. The nodulated pulp, whose consistency can be raised from three percent or less to ten to twenty percent or more in the de-watering area, is then forced by the gyratory movement of the upper plate and by the contour of the sweep arms and by the pressure behind it of the continuously flowing pulp, radially outward between the upper and lower working surfaces, where it is rolled and re-rolled in different directions due to the orbital motion of the upper working surface while it is in tractive contact with and under compression between these surfaces. This causes the nodules of the pulp to be formed and re-formed into different units and the pulp fibres to be bent and twisted and rigorously curled as the units of nodules roll transversely over and between the working surfaces. Thus, the properties of the pulp are modified and the results are attained which are sought by the process of Patent No. 2,516,384.

The gyratory motion of the upper working plate traverses the pulp toward the periphery of the lower plate, and when it reaches the edge of the lower plate, the treated pulp drops into a trough which surrounds the lower plate and which has a bottom sloping to one side of the machine so that the pulp may be sluiced to one point for removal from the machine. The sluicing water may be the white water removed in the thickening operation or water supplied from some other source as desired.

The rate of traverse of the pulp across the working surfaces, which determines the extent of treatment of the pulp, can be controlled through several different features of the machine illustrated. The lower plate may be made in sections which are adjustable separately and independently of one another toward and away from the upper plate so that the distance between the upper and lower working surfaces can be narrowed, for instance, as the pulp approaches the edge of the lower plate, thereby to set up a back pressure on the pulp and insure longer working of it than would be the case were there a uniform distance between the upper and lower plates. Again, the upper surface may be moved toward and from the lower surface cyclically, alternately diminishing and increasing the distance between the upper and lower plates. To accomplish this movement, there are a plurality of hydraulically actuated plungers connected at spaced points to the upper plate, and equalizing means are provided so that the upper plate always moves parallel to itself. Further, the working surfaces may be constructed so as to aid movement of the pulp toward the edge of the lower working plate, or to resist such movement, or part of the lower working surface may be constructed to assist and part to resist said movement, as may be desirable with the type of pulp being treated.

Referring now to the drawings by numerals of reference, 20 denotes the base or bed of the machine. Journalled in this base or bed in any suitable manner (Fig. 3) is a hollow shaft 24. This shaft is internally threaded adjacent its upper end to receive and engage the externally threaded portion of a rotary sweep head 25 which is adapted to rotate with the shaft.

The sweep head is bored to have an opening 26 aligning with the bore 27 of the shaft 24. It has a plurality of arms 28 (Figs. 3 and 6), which extend radially outwardly from the head and are of longitudinally spiral shape, and which in the embodiment shown are integral with the head. These arms are all alike. They may have generally convex upper surfaces 30 which are slightly roughened, as by filing, and generally tapered lower surfaces 31 which are inclined and generally conical.

The shaft 24 is adapted to be driven from a motor 35 (Figs. 1 and 2), which is mounted on an extension of the base of the machine, the drive being through a shaft 36 (Fig. 3) which is driven from the armature shaft of the motor and which has a worm 37 keyed to it that meshes with and drives a worm wheel 38. The worm wheel is keyed or otherwise fastened to a sleeve 39 that is secured in any suitable manner to shaft 24.

As the sweep head rotates, its arms 28 travel over a perforated conical de-watering plate 40 (Figs. 3 and 5). The under-surfaces 31 of the arms closely fit the conical upper surface of this plate so that as they rotate they may sweep the whole of the plate. The clearance between the bottom surfaces 31 of the sweep arms and the upper surface of the plate may be determined by axial adjustment of the sweep head 25 in the shaft 24. The de-watering plate is secured in any suitable manner to a stepped casting 41 that is in turn fastened to a chambered member 42, which is secured to the base 20 of the machine.

The casting 41 is provided with three concentric series of angularly spaced holes, the holes of the three series being designated 45, 46, and 47, respectively (Figs. 5 and 6). These three series of holes communicate, respectively, with three concentric annular chambers or channels 48, 49 and 50 formed in the member 42. The chambers 48, 49 and 50 are drained by pipes 54, 53, and 52, respectively (Fig. 3), which are connected to holes in the bottoms of the chambers.

The aqueous slurry of pulp, which is to be treated, is supplied to the machine through a pipe 55 which communicates and registers with the bore 27 of the shaft 24.

Secured to the base or frame 20 of the machine in any suitable manner to surround the chambered member 42 is a casting 60 (Fig. 5) having concentric seating portions 59. Mounted upon the seating portions of the casting 60 are four concentric rows of segments designated 61, 62, 63, and 64, respectively (Figs. 5 and 6). These segments are adapted to be removably secured to the casting 60 by T-bolts 65 whose cross-arms engage over hooked furcations 67 formed integral with the undersides of the different segments. Nuts 68, which thread onto the shanks of the bolts 65, serve to secure the segments in position. The knurled segmental plates 70, which constitute the lower working surface of the machine, are secured to the segments 61, 62, 63 and 64 by screws or rivets or any other suitable means.

The contour of the lower working surface of the machine can be varied at will by interposing varying numbers of shims 71 between the segments 61, 62, 63, and 64 and the seating portions 59 of the casting 60, as shown in Fig. 5.

The upper surfaces of the segments 61, 62, 63 and 64 are channeled, and a hole 72 may be formed centrally in each segment. Flexible hose 73 may be threaded into the holes 72 to conduct away the water which is pressed out of the pulp as it rolls over the lower working surface. Thus, the pulp may be further thickened in process of treatment between the opposed working surfaces.

The base or frame of the machine is formed with spaced parallel uprights 80 (Figs. 1 and 2), which are formed with guideways 81 on which saddle 82 slides. Journalled in this saddle in any suitable manner is a shaft 84 (Figs. 1, 5 and 13) which is formed at its lower end with an enlarged head 85. This head is circular in shape and is provided on its under-surface with a diametral slot 86 in which is slidably mounted a crank block 87. This crank block has a diametral slot 88 in it which permits of its rectilinear adjustment in the head 85, and it may be secured to the crank plate 85 in any adjusted position by a bolt 89 which is mounted in shaft 84 and whose head engages over block 87. This bolt threads at its upper end into a nut 83.

Adjustment of the block 87 in plate 85 permits of varying the throw of the crank block 87. The block 87 is fastened by studs 90 to two spaced plates 91 and 92 which are formed with concentric concave spherical openings 93 to receive the concentric convex spherical surfaces 94 of a bearing 95 that fits over the hub-like extension 96 of a driving member 97. This driving member 97 is secured by studs 98 to a plate 99. The knurled plate 100, which constitutes the upper working surface of the machine, is secured to the under side of this plate 99 by screws or rivets, or in any other suitable manner.

The shaft 84 is adapted to be driven from the main drive motor 110 (Fig. 1) of the machine, the armature shaft 111 (Fig. 2) of this motor being connected by a suitable coupling 112 to a shaft 113. This shaft has a bevel gear 115 (Fig. 1) secured to its forward end, and this bevel gear meshes with the bevel gear 116 which is fastened to shaft 84. The motor 110 is carried in a cradle or support 117 that is fastened by bolts 119 and nuts 118 to saddle 82 to move up and down with saddle 82.

Figure 13:
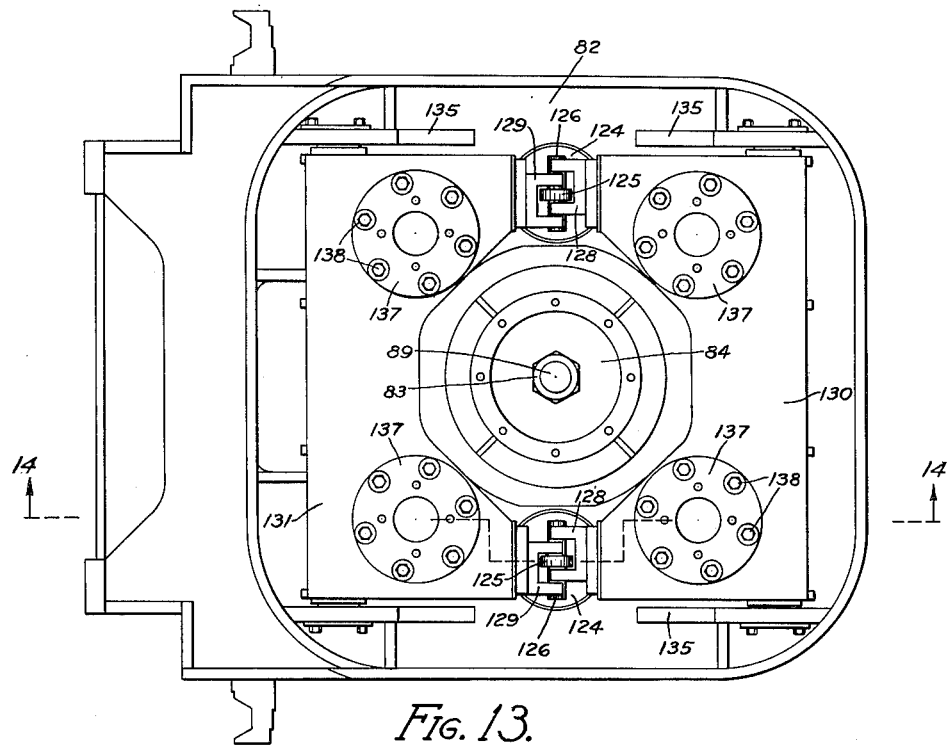
Fig. 13 is a fragmentary plan view, with parts broken away, showing details of the mechanism for applying regulated pressure upon the stock being treated.
Figure 14:
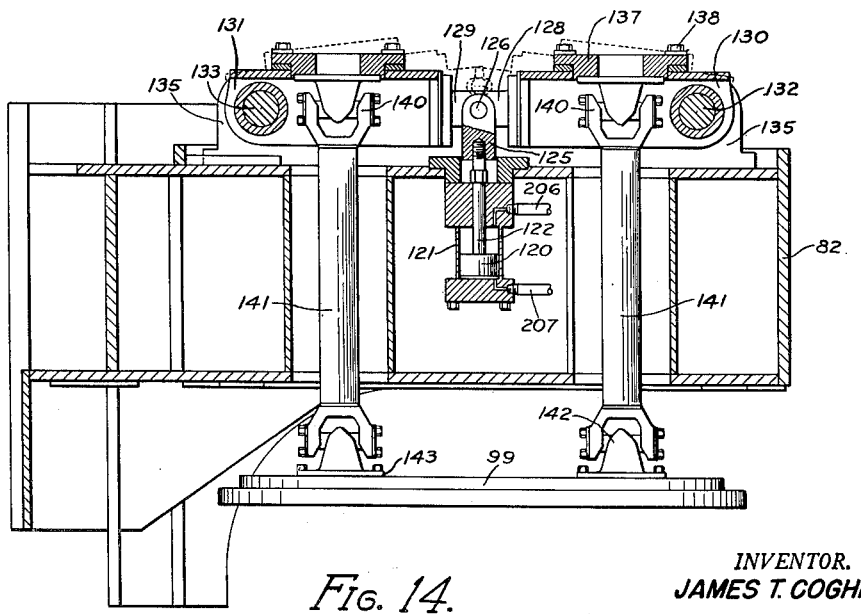
Fig. 14 is a section on the line 14—14 of Fig. 13, looking in the direction of the arrows.

During operation of the machine, a predetermined pressure is applied to the upper working surface 100 and this working surface may also be moved cyclically toward and from the lower working surface 70. The floating of the upper plate under load and the cyclical movement of this plate toward and from the lower plate are effected by operation of a pair of pistons 120 (Figs. 14 and 17) which reciprocate in cylinders 121 that are secured in any suitable manner to saddle 82. The piston rods 122 of these pistons extend through the upper end walls 124 of the cylinders and are threadedly connected to yoke members 125 (Figs. 13 and 14). These yoke members are connected by hinges or pins 126 with bifurcated members 128 and 129 that are secured to plates 130 and 131, respectively. There is a bifurcated member 128 at each end of plate 130 and a bifurcated member 129 at each end of plate 131 to cooperate with two yokes 125 of the two pistons 120.

The plates 130 and 131 are mounted to swing on shafts 132 and 133, respectively, which are secured at opposite ends in brackets 135 that are mounted on the saddle 82. Mounted in each of the plates 130 and 131 are two heads 137 that are secured to the plates by bolts 138. These four heads are connected by Cardan joints or gimbals 140 with four rods 141. The lower ends of these four rods 141 are connected by other Cardan joints or gimbals 142 with four plates 143 (Figs. 5 and 14) that are bolted at equispaced points to the plate 99.

Pressure on the upper surfaces of the pistons 120, then, applies a load to the pulp being rolled between the upper and lower working surfaces of the machine, and through use of a fluid medium for application of pressure, the upper working surface may float under a predetermined load. Reciprocation of the pistons 120 effects up and down movement of plate 99 to move the upper working surface 100 toward and from the lower working surface 70. The plates 130 and 131 equalize this movement, so that the upper surface always moves parallel to itself. The plates 130 and 131, which may therefore be termed equalizing members, are shown in full lines in Fig. 14 in the position where the pistons 120 are at the lower ends of their strokes, while the plates are shown in dotted lines in this figure in positions which they occupy when the pistons are at or near the upper ends of their strokes. The hub-like extension 96 of drive member 97, is slidable vertically in its bearings 95 to allow of this movement.

The mechanism for controlling the operation of the pistons 120 is shown in Figs. 15 to 17 inclusive. The hydraulic motive fluid is supplied to these pistons from a sump 150, which is provided in the base of the machine, by operation of a pump 151, which draws the fluid out of the sump through the duct 152.

The pressure fluid passes from the pump 151 through a duct 153 to a standard relief valve 154 to which there is connected a return line 155. From the relief valve 154, the pressure fluid is conducted by a duct 156 to a standard manually operable four-way valve 157. The valve 157 is provided with two right angular ducts 158 and 159. It is connected by a duct 160 with a pressure gauge 162. The duct 160 also communicates with a duct 163 which leads to a manually operable shut-off valve 164.

This valve is connected by a duct 165 with the chamber 166 of a valve 167. This valve is normally pressed in one direction by a coil spring 168. It may be moved in the opposite direction by a rotary cam 170. The stem of the valve carries a roller 171 which rides on the periphery of this cam.

A duct 173 connects the valve casing 166 with a duct 174 that communicates with the lower end of a cylinder 175. Mounted to reciprocate in this cylinder is a piston 176. The piston has a piston rod 177 projecting through the upper end of the cylinder 175. This piston rod engages a lever arm 178.

In actual practice, the lever arm 178 may be made of two strap members, as shown in Fig. 16, which straddle the head of the piston rod 177 and may be pivotally connected thereto. The lever arm 178, or the two strap members of which it is composed, is secured to a shaft 180 that is journalled in brackets 181 that are secured by screws 182 to a stand 183. This stand is mounted in any convenient position in the base of the machine.

Connected to the shaft 189 are a pair of strap members 185 constituting a lever arm, which carries at its free end a roller 186 that rides on the periphery of a cam 187. The cam 187 is keyed to the same shaft 188 to which the cam 170 is secured. The shaft 188 is adapted to be driven from a motor 190, which is mounted upon the stand 183. The armature shaft 191 of this motor is connected by a suitable coupling 192 with a worm shaft 193 that carries a worm 195. This worm meshes with a worm wheel 196 which is keyed or otherwise fastened to shaft 188.

The duct 174 connects not only with the cylinder 175 but also with a manually operable shut-off valve 200. The duct 163 communicates not only with the shut-off valve 164 but also with a duct 201 that leads to a manually operable shut-off valve 202. There is a duct 203 leading from the valve 202. A duct 204 leading from the valve 200 communicates with the duct 203. The duct 203 is connected by suitable piping 205 with two ducts 206 that lead, respectively, to the upper ends of the two cylinders 121. The lower ends of these two cylinders are connected by ducts 207 with a duct 208 that is connected to the duct 159 of valve 157. A duct 210 leads from this valve back to the sump 150.

The machine can operate with the upper plate pressed toward the lower plate under the regulated pressure determined by the adjustment of relief valve 154, or it can operate with the upper plate moved cylically toward and from the lower plate under control of cam 187. In the former case, the regulated pressure on the upper plate tends to hold the upper plate at a predetermined distance from the lower plate, but the upper plate is free to float, and, if the pressure of the pulp under treatment between the working surfaces exceeds the regulated pressure, then the upper plate moves upwardly against the regulated pressure to allow more of working clearance between the upper and lower working surfaces. The shut-off valves 164, 200, and 202 are only employed to connect and disconnect the pulsator piston 176 from the operating pistons 120.

When the pulsator is not operating, the valve 202 is open and the valves 164 and 200 are closed. This puts the pressure of pump 151, as regulated by relief valve 154, directly on the pistons 120 to hold the upper working surface 100 in engagement with the pulp, passing between the working surfaces, under this predetermined pressure.

When the pulsator is operating, the valve 202 is closed and the valves 164 and 200 are open. This is the set-up assumed in Fig. 17. In the position of the valve 167 shown in this figure, the regulated oil pressure is supplied to the group of three cylinders comprising the two cylinders 121 and the cylinder 175. With the cam shaft 188 rotating in the direction of the arrow 215, the roller 171 of the valve stem is just about to drop off of the high part of cam 170 onto the low part of this cam. When this happens, the valve 167 will be moved upwardly by pressure of spring 168 and port or duct 165 will be closed off. The cams 170 and 187 are so constructed that this action will precede by a few degrees the point at which the roller 186 of rocker arm 185 drops off of the high part of cam 187.

When the port 165 is closed, the two cylinders 120 and the cylinder 175 constitute a closed hydraulic system wherein the motion of the power-driven pulsator piston 176 controls the motion of the two pistons 120. The port 165 is closed, however, only during about one-third of a revolution of cam shaft 188 because the low part of cam 170 occupies only about one-third of the periphery of the cam.

During this portion of the cycle, the piston 176 will be forced gradually downwardly in its cylinder 175 by the gradual rise of cam 187. This will force the pistons 120 gradually downwardly in their cylinders 121 to apply added pressure to the pulp moving between the opposed working surfaces of the machine. When the port 165 is reopened by downward movement of valve 167, the piston 176 will have returned to its original, down position shown in Fig. 17, and the pulsating portion of the cycle will have been completed.

When the valve 167 opens the line 173 to supply from the line 165, the regulated hydraulic pressure becomes effective again.

As illlustrated, a complete cycle is 360 degrees of rotation of the shaft 188. We have used approximately one-third of that for the pulsating portion of the cycle. This leaves about two-thirds of the cycle for the upper working plate of the machine to float as dictated by the vertical pressure of the pulp between the two working surfaces.

The action provided by the pulsator illustrated is purely a one way action. It is obvious that if there were no force supplied by the pulp, which is being treated, to raise the two machine pistons 120, there would be no movement of the pulsator piston 176. Under ordinary circumstances, however, there is sufficient upward pressure exerted by the pulp against the upper working surface, so that when the roller 186 of rocker arm 185 drops off of the high part of the cam 187, the upward pressure of the pulp acts to raise the piston 176, and this piston is lowered again by the action of the cam 187 itself. Thus is obtained the cyclical movement of the upper plate toward and from the lower working surface, which is desired. Obviously, however, it would be possible to make the piston 176 operate positively in both directions.

The duct 211 which leads from the upper end of the cylinder 175 is simply a vent which permits escape of any air entrapped between the upper face of the piston 176 and the upper end wall of the cylinder 175.

Figure 1:
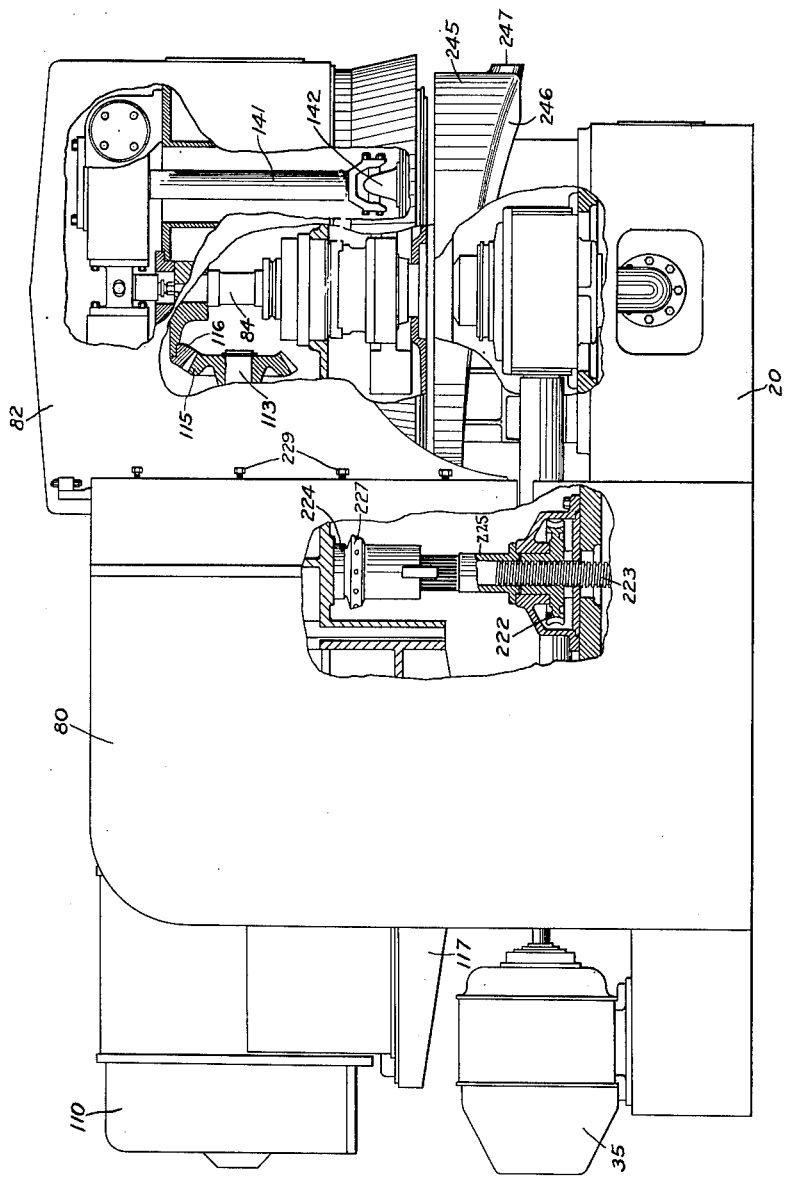
Fig. 1 is a side elevation, with parts broken away, of a machine built according to a preferred embodiment of this invention.

The amount of pressure on the pulp during the non-pulsating portion of the cycle is determined by the vertical pressure of the pulp between the two working surfaces. The distance between the upper and lower working plates may be adjusted by adjustment of the saddle or slide 82. Movement upward and downward of the slide 82 may be effected by operation of the motor 220 (Fig. 2), which is mounted in the base of the machine. The armature shaft of this motor drives a worm (not shown) that meshes with a worm wheel 222 (Fig. 1). This worm wheel is formed integral with a nut that engages the elevating screw 223. This screw is connected in any suitable manner, as by plate 224, to the lower face of the drive housing 117. The plate 224 may be an integral part of screw 223 and be bolted to housing 117 by bolts (not shown). An adjustable stop-nut 227, which is threaded on the post 225, serves to limit downward movement of the saddle and prevent the working surfaces 70 and 100 from scrubbing against one another. The saddle can be secured in any adjusted position by gibs 228 which are operated by screws 229 (Figs. 1 and 2). Operating conditions can be observed and necessary changes made by movement of the saddle upwardly to carry working surface 100 completely away from lower working surface 70.

It will be apparent that for proper operation of a machine constructed according to the present invention, working surfaces must be provided that are knurled, figured, or otherwise roughened so as to grip the pulp and resist slippage of the working surfaces on the surface of the pulp pressed against them as the gyrating surface partakes of its gyratory or orbital motion. The working surfaces must have tractive contact with the pulp, for it is this tractive contact plus the relative gyratory motion of the opposed surfaces, plus the compression exerted on the pulp by the surfaces which cause the pulp in the form of small units to traverse rollwise relative to the surfaces, and produce the unique effects of the process of Patent No. 2,516,384.

Obviously a proper working surface for this purpose must not have a type of roughness which will entangle and retain pulp fibres, nor can it have projections and configurations of such size, shape, or spacing as to interfere with the intended rollwise traverse of small pulp units over the surface. What is required is a surface which will promote rollwise traverse of the pulp units under the conditions of operation. The range of surface textures and configurations, which may be used, will depend upon the type of pulp and the operating conditions of a particular use. Thus, a long fibred pulp, such as kraft, will permit the use of a generally coarser surface pattern than will a short fibred pulp such as groundwood.

We have found that the working surfaces are most suitable and most productive when they consist of basically flat or smooth surfaces upon which are superimposed a multiplicity of tiny protrusions in the form of pointed pyramids. Such surfaces have a high degree of traction on the material being treated between them so that the gyratory motion or working force can be transmitted into and throughout the relatively thin layer of pulp from opposite sides and from opposed and rapidly changing tangential or lateral directions. Grooves in the working surface tend to be less productive than points extending thereabove, since they offer cavities in which nodules may become embedded and thus diminish the tractive qualities of the surface.

In the machine described in the co-pending application of James T. Coghill and Harold S. Hill, Serial No. 705,540, filed October 25, 1946, knurled working surfaces are employed like those shown in Fig. 11 of the drawings of this application. In the machine of the present invention, such working surfaces may also be employed, but it is preferred to make at least a portion of the working surfaces of the machine of the construction shown in Figs. 7 to 10 inclusive.

The working surface shown in Fig. 11 comprises an essentially flat surface 230 having pyramidal protrusions 231 projecting upwardly therefrom. These have a symmetrical pattern in the form of closely spaced regular quadrilateral pyramids which project from the basic surface 230.

The working surface shown in Figs. 7 and 8 comprises a base portion 235 which has an essentially flat upper surface and which has pointed protrusions 236 projecting therefrom which are of pyramidal shape but which all lean in the same direction and which are thus less resistant to slippage of the rotatable pulp units in the direction in which they lean. Both upper and lower working surfaces may be made of this structure. At least a part of the lower working surfaces, however, are preferably made of the form shown in Figs. 9 and 10. These are like the surfaces of Figs. 7 and 8 except for the provision of drain holes or ducts therein. In the form shown in Figs. 9 and 10, the working surface has a base portion 240 which comprises essentially a flat surface from which project pyramidal portions 241 that all lean in the same direction. Here, however, the base portion is drilled at intervals, as denoted at 242, to permit water or any other liquid to flow into or away from the pulp being treated. These holes 242 are intended to communicate with the channels of the segmental plates 61, 62, 63, and 64, and with pipes 73 (Fig. 5).

Working surfaces of the structure shown in Figs. 7 to 10 inclusive will of themselves induce migration of the layer of pulp under treatment. When so placed that they lean in the direction of the periphery of the working surfaces, that is, in the direction of the discharge zone they speed up the migration of the pulp. When so placed that they lean in the direction of the feeding zone, that is, toward the center of the lower working surface, they retard the migration.

It is to be understood that various combinations of directional and non-directional working surfaces may be employed in the machine as may prove desirable in a particular case. For instance, a band of non-directional surfaces, such as shown in Fig. 11, may be secured to the outer plates 64 (Fig. 6) of the machine so as to hold the pulp back a little to insure further treatment, or this outer band of working plates may be of the directional type shown in Figs. 7 to 10 inclusive, and may be directed inwardly, thereby to oppose the movement of the pulp still further and insure further increased treatment thereof.

The size of the pointed protrusions 231, 236, or 241 may range from .005 inch in height up to .075 inch depending upon the length and other characteristics of the fibre and also upon the degree of compression which is to be employed in treating the fibre for a particular purpose. Higher degrees of compression in general require a larger number of points having less height.

In order to permit rollwise traverse of pulp nodules or of rotatable units thereof, we have found that the pointed protrusions should be spaced adjacent to one another a distance of from two to three times their height. If the spacing is too close the cavities between the points may fill up with stagnant pulp and the surfaces will not be self-cleaning which is a necessary condition in obtaining the required rollwise traverse. If the pointed protrusions are spaced too far apart, the gripping of the nodules or of rotatable units thereof is diminished and the required rollwise traverse can not be achieved at as high a speed or under as high compression.

A symmetrical pattern of pyramidal pointed protrusions is preferred since such a pattern may be machined on a metal surface by means of milling cutters. It has been found that the included angle formed by mutually facing sides of adjacent pointed protrusions is important. If the angle is too great, the material being treated will tend to slip, while if the angle is too small, the material will tend to bind around the protrusions and rollwise traverse of pulp nodules or of rotatable units thereof will be impeded. In the surfaces shown in Figs. 7 to 10 inclusive, the sides of the pyramids in a section on a line, such as the line A—A of Fig. 7, are inclined to one another at an angle of approximately 95 degrees and on a line, such as the line B—B of Fig. 7 they are inclined to one another at an angle of approximately 60 degrees. In a section, such as along line B—B, the lands between the bases of adjacent pyramids are .015 inch in width, while the bases of the pyramids measure .035 inch, and the pyramids have a height of .023 inch.

In the operation of the machine illustrated, the stock, which is of low density, about 3% consistency, enters the working area of the machine through the pipe 55 and the bore 27 of the shaft 24, the bore 26 of the sweep head 25 and the spaces between the sweep arms 28. It fans out over the de-watering plate 40 and up against the gyrating upper working surface 100. As it spreads out over the de-watering plate 40, water drains from the pulp through the holes in that plate and the holes in the casting 41 into the several channels 48, 49 and 50. As the sweep head rotates, the sweep arms clear the thickening stock from the surface of the de-watering plate 40 while at the same time squeezing portions of the stock between their surfaces 30 and the opposed upper working surface 100. The rotating sweep arms also urge the thickening stock radially outwardly over the de-watering surface 40 onto the lower working surface 70. The upper working surface 100 is, of course, moving in an orbital path under actuation of the crank 85 and block 87. Hence, as the stock is carried between the roughened surfaces 30 of the sweep arms and the knurled upper working surface 100, it is rolled traversingly in different tangential directions in tractive contact with and between these surfaces. Thus, it is formed into small discrete nodules of pulp in which the fibres are curled and twisted upon one another. In this condition it will not mat, nor clog the holes of the de-watering plate, but it will leave the water free to run out of those holes. Thus fast drainage and consequently fast dewatering per unit of drainage area can be obtained. Moreover, it is easy for the sweep arms to sweep up the nodulated pulp.

The nodules of fibres roll over the backs of the sweep arms and either join other pulp on the de-watering plate or are carried by the gyratory motion of the upper working surface radially outwardly beyond the sweep arms onto the lower working surface 70. The nodules that roll over the sweep arms onto the pulp on the de-watering plate may be gathered up again by the rotating sweep arms and squeezed again between these arms and the upper working surface 100 or, if near the outer portion of the de-watering plate, may be swept by the arms onto lower working surface 70. By the time the stock has reached the limits of the de-watering zone, it has been thickened to 10 to 20% consistency or more and is substantially completely nodulated. From this point the nodules are gripped and vigorously rolled between the upper and lower surfaces 70 and 100, while they are caused to progress radially outward toward the periphery of the lower working surface. Simultaneously they may be further thickened by drainage of water away through holes 242 (Fig. 10) of the lower working surface. In their outward travel, the nodules are grouped and regrouped into units which are rolled traversingly tangentially in different directions in tractive contact with and between the working surfaces, and are continuously reoriented with reference to the direction of applied pressure.

The dotted lines in Fig. 5 show different positions 89' and 89'' of the bolt 89 as the crank shaft 84 rotates, and in Fig. 2, there are shown at 99', 99, and 99'', respectively, three different positions of the circular upper plate 99 as it partakes of its orbital motion. Corresponding positions of the crank plate are also shown in dotted and in full lines in this latter figure.

As the units of nodules traverse the working surfaces, they are subjected to pressure. This pressure may be a continuous, uniform regulated pressure controlled by relief valve 154 (Fig. 17), in which case the upper working surface 100 of the machine will float as dictated by the pressure of the pulp, or it may be a cyclically varying pressure under control of cam 187 in which case periodically the pressure will be decreased and increased and then the regulated pressure will be resumed again. The hinged arms 130 and 131 insure that if the pressure is varied cyclically the upper working surface will move bodily parallel to itself and will be level at all times. This prevents the stock from squirting out of one side of the machine as would be the case if the upper working plate tilted. The gimbals prevent rotation of the upper plate.

When the pulp reaches the edge of the lower plate, it falls into a trough 245. This trough has an inclined or helical bottom surface, as denoted at 246 in Fig. 3. White water may be taken from the de-watering area of the machine, as from the pipe 54 (Fig. 3) and discharged into this trough to sluice the pulp down to the discharge outlet 247. To this end, the pipe 54 may be connected in any suitable manner to a pipe 248 which discharges upwardly into the trough 245. A deflector 249 (Fig. 4) may be secured in the trough above the outlet of this pipe 248 so as to deflect the water discharging from the pipe 248 to both sides and cause it to wash the pulp down the trough. The water may at the same time help convert the nodulated pulp to a dispersed fibre suspension state in which it can readily be handled for further processing if desired.

To protect the mechanism of the drive to the upper plate, a canvas or synthetic rubber guard 250 (Fig. 5) may be provided. This is adapted to be secured in any suitable way at its upper end to a ring member 251 which is secured to the saddle 82 and at its lower end in any suitable manner to the flange portion 252 of the upper plate 99. In Fig. 5, three positions of this guard are shown at 250', 250, and 250'', respectively, as it moves with the upper plate in the gyratory movement of that upper plate.

From the preceding description it will be seen that a machine has been provided in the form of a single, compact mechanical unit that will occupy a minimum of floor space, and that will accept low density stock, de-water that stock, and then treat it according to the process of Patent No. 2,516,384. By dividing the lower working surface into annular rings each composed of a plurality of sections or segments, we can alter at will the contour of the lower working surface in a very short time to control the rate of flow of pulp between the working surfaces. By breaking the lower working plate into sections, moreover, each section can be made completely water-tight, and at all times complete control of the operation of the machine can be maintained through knowledge of the quantity and quality of the water expressed at different points. Any lower plate section can be removed and replaced without disturbing the adjacent ones. By making the upper plate free to float during part of the cycle and varying the pressure thereon during another part of the cycle, we can encourage the rollwise traverse of the pulp at higher speeds and loads as well as assist in the control of the overall outward travel of the pulp. Through the structure of the working surfaces themselves the rate of outward flow of the pulp being treated can still further be controlled.

The pipes 73 may be used to carry off the water expressed from the stock as it rolls across the lower plate from the dewatering zone to the discharge zone. Some of these pipes may be used also, however, to supply a liquid to the pulp as it is travelling over the lower working surface.

Thus a bleach or a detergent may be supplied through the set of pipes connected with one ring section of the lower plate and drawn off through the pipes attached to a ring section which is at a greater radial distance from the center of the machine. Thus, the machine may be used for bleaching pulp, reclaiming newsprint, etc. Further it may be noted that instead of adding water to the stock only in the trough 245, water may be added at the outermost ring section of the lower plate through the associated pipes 73. The provision of a plurality of pipe connections with the several ring sections permits of a variety of liquid flow patterns.

While the invention has been described in connection with a preferred embodiment thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for treating papermaking pulp, a drainage plate having perforations therethrough through which liquid may drain, an inlet for delivering an aqueous slurry of stock onto the drainage plate, a sweep member movable over said drainage plate for sweeping the thickening stock up off of said drainage plate, a lower working plate contiguous to said drainage plate, an upper working plate overlying said sweep member and said lower working plate and adapted to cooperate with both, each of said working plates being roughened for tractive contact with the thickened stock, means for urging one of the working plates toward the other under pressure to compress pulp between them, means for moving the sweep member over the drainage plate, and means for imparting movement to said upper working plate in a direction at right angles to the direction of compression to roll the thickened stock tractively in traverse of and between the sweep member and the upper working plate and tractively in traverse of and between the upper and lower working plates.

2. In a machine for treating papermaking pulp, a drainage plate having perforations therethrough through which liquid may drain, a hollow shaft disposed centrally of said drainage plate and through which an aqueous slurry of stock may be delivered to said drainage plate, a sweep arm secured to said shaft to rotate therewith and extending over said drainage plate, means for rotating said shaft continuously, a lower working plate surrounding said drainage plate, an upper plate overlying both the sweep arm and the lower working plate to cooperate with both, means for imparting an eccentric gyratory movement to the upper working plate about an axis extending in the direction of the axis of the shaft, and means constraining the said movement of the upper working plate so that all points of said plate trace identical paths relative to the lower working plate.

3. In a machine for treating papermaking pulp, a frame, a pair of opposed working plates mounted on the frame, means for supplying a slurry of stock between said plates, means for moving one of said plates on said frame eccentrically about an axis, a plurality of parallel rods equi-angularly spaced about said axis, universal joints for connecting said rods at corresponding ends to said movable plate, a pair of equalizing members movable mounted on the frame, universal joints for connecting the opposite ends of some of said rods to one of said equalizing members, universal joints for connecting the corresponding opposite ends of the other rods to the other equalizing member, means connecting the two equalizing members so that movement of one is transmitted to the other so that the rods all move together axially of said axis and through equal distances, and fluid-pressure operated means for urging the equalizing members in one direction to hold the plates in operative relation under pressure.

4. In a machine for treating papermaking pulp, a drainage plate having perforations therethrough through which liquid may drain, an inlet through which an aqueous slurry of pulp may be supplied onto said drainage plate, a sweep member movable over the drainage surface, said sweep member having its front face upwardly and rearwardly inclined, a working plate contiguous to said drainage plate to receive thickened stock from the drainage plate, a second working plate mounted in opposed relation both to the first working plate and to the sweep member, means for holding the second working plate in operative relation under pressure with the first working plate and with the sweep member, means for moving the sweep member over the drainage plate, and means for effecting relative movement between the working plates in a direction at an angle to the direction of applied pressure.

5. In a machine for treating papermaking pulp, a drainage plate having perforations therethrough through which liquid may drain, a hollow shaft disposed centrally of said drainage plate and through which an aqueous slurry of stock may be delivered to said drainage plate, a sweep arm secured to said shaft to rotate therewith and move over said drainage plate, means for rotating said shaft continuously, a lower working plate surrounding said drainage plate, an upper working plate overlying both the sweep arm and the lower working plate to cooperate with both, means for holding the upper working plate in operative relation under pressure with the lower working plate and with the sweep arm, and means for imparting a circular translatory movement to the upper working plate about an axis extending in the direction of applied pressure.

6. In a machine for treating papermaking pulp, a perforated, generally conical drainage plate, an inlet disposed substantially at the apex of said conical plate through which an aqueous slurry of stock may be delivered onto said plate, a lower working plate surrounding said drainage plate at the base portion of the cone thereof, a rotary sweep head mounted coaxial with said inlet and having a plurality of sweep arms which project outwardly therefrom and which overlie said drainage plate, said sweep arms being curved spirally about the axis of the head and having undersurfaces which closely fit said drainage plate and upper surfaces which are inclined upwardly and rearwardly of the direction of rotation of the arms, an upper working plate overlying said arms and the lower working plate and adapted to cooperate with both, means for rotating the sweep head continuously, and means for urging the upper working plate toward the sweep arms and lower working plate under pressure, and means for imparting orbital motion to the upper working plate about an axis extending in the direction of applied pressure.

7. In a machine for treating papermaking pulp, a pair of opposed working plates, a rotary crank connected to one of said working plates for imparting an eccentric movement to the same, a pair of swingable plates, a piston and a cylinder, means for applying fluid pressure selectively to opposite ends of the piston, means connecting said swingable plates to one another and to said piston and cylinder so that on reciprocation of said piston in said cylinder swinging movement is imparted to said swingable plates, and means connecting said swingable plates to said one working plate to move said one working plate in the direction of the axis of its eccentric movement on swinging movement of said swingable plates, comprising a plurality of rods, each of which has a universal joint connection at one end with a swingable plate and a universal joint connection at its opposite end with said one working plate, the points of said last-named connections being spaced from one another.

8. In a machine for treating papermaking pulp, a pair of opposed working plates arranged to form therebetween a working space, an inlet at one boundary of the working space and an outlet at another boundary of the working space, a duct for supplying pulp to the inlet, means for imparting an orbital movement to one of said plates, a first cylinder and a first piston reciprocable therein, means connecting said first piston and first cylinder to one of said plates to move said one plate toward and from the other plate in the direction of the axis of said orbital movement on movement of said first piston in said first cylinder, a second cylinder and a second piston reciprocable therein, a duct connecting one side of the two pistons together, a duct leading from the opposite side of said first piston, means for supplying a hydraulic motive fluid, a valve controlling connection of said supply means with said connecting duct, means for actuating said valve periodically to close off the supply of the motive fluid to said connecting duct so that said two pistons and cylinders and said connecting duct then constitute a closed hydraulic system, and means operable in said periods for moving said second piston and cylinder relative to one another in a direction opposite to the direction in which it is moved when said connecting duct is connected to said supply means.

9. In a machine for treating papermaking pulp, a perforated drainage plate, an inlet disposed centrally of said plate for delivering a slurry of stock onto said plate, a working plate surrounding said drainage plate, a rotary sweep arm mounted coaxial with said inlet and overlying the drainage plate, said arm having an undersurface closely fitting the drainage plate and an upper surface which is inclined upwardly and rearwardly of its direction of rotation, a second working plate overlying said sweep arm and the first working plate and adapted to cooperate with both, means for rotating said sweep arm continuously, means for imparting movement to the second working plate about an axis parallel to the axis of the sweep arm, and means for periodically moving the second working plate in the direction of its axis toward and from the sweep arm and first working plate.

10. In a machine for treating papermaking pulp, a perforated drainage plate, an inlet disposed centrally of said plate through which an aqueous slurry of stock may be delivered onto said drainage plate, a rotary arm for sweeping thickening stock up off of said drainage plate, means for continuously rotating said arm, a lower working plate surrounding said drainage plate, an upper working plate overlying both the sweep arm and the lower working plate and adapted to cooperate with both, means for imparting orbital movement to the upper working plate about an axis parallel to the axis of rotation of the sweep arm, a trough surrounding the lower working plate into which treated pulp may drop, and means for conducting liquid, that is expressed from the stock at the drainage plate, to the trough.

11. In a machine for treating paper-making pulp, a pair of opposed working plates arranged to form therebetween a working space, an inlet at one boundary of said working space and an outlet at another boundary of the working space, means for holding the plates in operative relation under pressure to compress pulp between them, and means for effecting relative movement between said plates in a direction at right angles to the direction of compression to roll the pulp traversingly between and over said plates, each of said plates having a continuous working surface at one side and at least one of said plates having its working surface continuous about said inlet, the working surfaces of the two plates being opposed to one another and bounding said working space, and each of said working surfaces being a basically plain surface which has between said inlet and said outlet a plurality of tiny, spaced, symmetrical protrusions projecting into the working space a sufficient distance only to have tractive contact with the pulp without obstructing rolling traverse of the pulp on and over said plates, each of said protrusions being spaced laterally on all lateral sides from the adjacent protrusions, each of said protrusions having its lateral sides converging away from its plate, some of the protrusions on one side of said plates, at least, being obliquely inclined to said one plate and inclined toward the outlet.

12. In a machine for treating paper-making pulp, a pair of opposed working plates arranged to form therebetween a working space, an inlet at one boundary of the working space and an outlet at another boundary of the working space, means for holding the plates in operative relation under pressure to compress pulp between them, means for effecting relative movement between said plates in a direction at right angles to the direction of compression to roll the pulp traversingly between and over said plates, each of said plates having a continuous working surface at one side and at least one of said plates having its working surface continuous about said inlet, the working surfaces of the two plates being opposed to one another and bounding said working space, and each of said working surfaces being a basically plain surface which has between said inlet and said outlet a plurality of tiny, symmetrical, spaced protrusions which project into the working space a slight distance to have tractive contact with the pulp without obstructing rolling traverse of the pulp on and over said plates and which are spaced laterally on all lateral sides from one another, some of the protrusions on one of said plates, at least, being obliquely inclined to said one plate.

JAMES T. COGHILL.

REFERENCES CITED

The following references are of record in the file of this patent:

UNITED STATES PATENTS

| Number | Name | Date |
| --- | --- | --- |
| 47,425 | Jones | Apr. 25, 1865 |
| 147,733 | Yearsley | Feb. 17, 1874 |
| 614,316 | Baker | Nov. 15, 1898 |
| 748,867 | Hodge | Jan. 5, 1904 |
| 758,874 | Terrell | May 3, 1904 |
| 1,065,332 | Newhouse | June 17, 1913 |
| 1,099,581 | Stobie | June 9, 1914 |
| 1,153,918 | Hollstein | Sept. 21, 1915 |
| 1,685,115 | Adams | Sept. 25, 1928 |
| 1,795,603 | Hussey | Mar. 10, 1931 |
| 2,035,994 | Sutherland | Mar. 31, 1936 |
| 2,042,566 | Tolman | June 2, 1936 |
| 2,121,275 | Zuber | June 21, 1938 |
| 2,156,321 | Sutherland | May 2, 1939 |
| 2,180,080 | Cowles | Nov. 14, 1939 |
| 2,323,490 | Scherff | July 6, 1943 |
| 2,368,291 | Dustan | Jan. 30, 1945 |
| 2,516,384 | Hill et al. | July 25, 1950 |
| 2,561,013 | Coghill et al. | July 17, 1950 |

FOREIGN PATENTS

| Number | Country | Date |
| --- | --- | --- |
| 103,083 | France | Apr. 20, 1874 |
| 109,762 | Australia | of 1940 |